(No Model.)

J. GROSS.
WHIFFLETREE HOOK.

No. 473,311. Patented Apr. 19, 1892.

Witnesses
Geo. W. Truny,
N. E. Oliphant

Inventor
Joseph Gross,
By H. G. Underwood
Attorney

THE NORRIS PETERS CO., PHOTO-LITHO., WASHINGTON, D. C.

UNITED STATES PATENT OFFICE.

JOSEPH GROSS, OF MILWAUKEE, WISCONSIN.

WHIFFLETREE-HOOK.

SPECIFICATION forming part of Letters Patent No. 473,311, dated April 19, 1892.

Application filed December 21, 1891. Serial No. 415,697. (No model.)

*To all whom it may concern:*

Be it known that I, JOSEPH GROSS, a citizen of the United States, and a resident of Milwaukee, in the county of Milwaukee, and in the State of Wisconsin, have invented certain new and useful Improvements in Whiffletree-Hooks; and I do hereby declare that the following is a full, clear, and exact description thereof.

My invention relates to that class of whiffletree-hooks in which a pivotal tongue is employed as a means for holding a trace upon the hook with which it may be engaged, and the object is to automatically compensate for wear between the tongue and parts adjacent thereto, as well as to prevent rattling of said tongue and insure of the latter maintaining the position to which it may be adjusted.

To this end my invention consists in certain peculiarities of construction and combination of parts to be hereinafter described with reference to the accompanying drawings and subsequently claimed.

Figure 1:
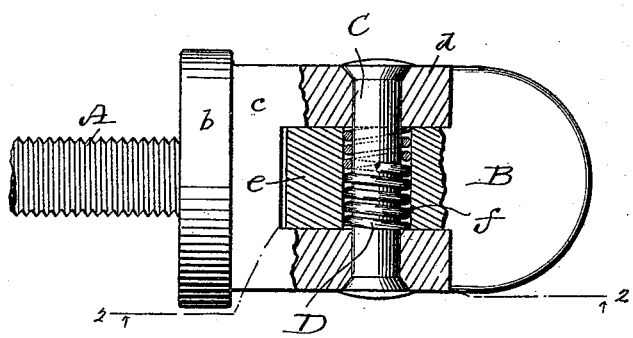
Figure 2:
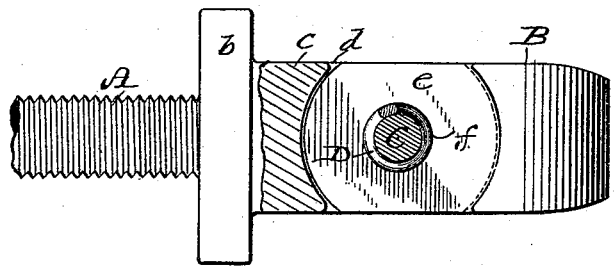

In the drawings, Figure 1 represents a plan view of the parts constituting my invention relatively arranged and partly in horizontal section; and Fig. 2 a side elevation, partly in section, on line 2 2 of the preceding figure.

Referring by letter to the drawings, A represents a screw-threaded shank cast in one piece with a head-plate b and bifurcated stem c to form the stationary portion of my device; but I do not wish to be understood as confining myself to a construction that necessarily involves a screw-threaded shank, as a ferrule may be as readily employed as a means for connecting my device to an end of a whiffletree, or, instead of said shank or ferrule, the head-plate may be made fast to the whiffletree by any suitable means, and it is also practical to omit this head-plate.

Arranged between the furcations d of the stem c, above described, is the shank e of a tongue B, and a pin C is passed through suitable openings in said furcations and shank to serve as a pivot on which the tongue is swung. The opening f in the tongue-shank e is of sufficient diameter to permit of a spiral spring D being arranged therein to surround the pin C; but it is not desirable that the openings in the stem furcations shall be of any greater diameter than will permit of the insertion of said pin, the latter being upset at its ends or otherwise retained in place. The spiral spring D is compressed within the opening f in the tongue-shank e when the latter is placed between the stem furcations d prior to the insertion of the pin C, and there is a snug fit between said spring and pin when the latter is positioned. The spring being under compression, its expansion longitudinally and transversely compensates for any wear that may take place between the tongue and the stem, to which said tongue is pivotally connected by means of the pin, while at the same time said spring absorbs vibration and prevents any rattling of the aforesaid tongue. Not only does the spring compensate for wear, as above described, but it also serves as a means for holding the tongue in any position to which the same may be adjusted, this being due to the friction of said spring and the parts adjacent thereto.

In placing a trace on the stem of the hook the tongue portion of this hook is swung on its pivot to stand in a horizontal position, in order that it may pass through the trace-eye, and the coupling being thus effected said tongue is turned so as to stand at more or less of a right angle to said trace, whereby the latter is held in position on said stem.

Having thus described my invention, what I claim as new, and desire to secure by Letters Patent of the United States, is—

1. The combination of a bifurcated stem for attachment to a whiffletree, a tongue having a portion thereof positioned between the stem furcations, a pivot-pin engaging these stem furcations and tongue, and a spiral spring compressed in said tongue around the pivot-pin and against both of said stem furcations, substantially as set forth.

2. The combination of a plate having a screw-threaded shank and a bifurcated stem on opposite sides thereof, a tongue positioned between the stem furcations, a pivot-pin engaging these stem furcations and tongue, and a spiral spring compressed in said tongue around the pivot-pin and against both stem furcations, substantially as set forth.

In testimony that I claim the foregoing I have hereunto set my hand, at Milwaukee, in the county of Milwaukee and State of Wisconsin, in the presence of two witnesses.

JOSEPH GROSS.

Witnesses:
N. E. OLIPHANT,
JOHN E. WILES.